United States Patent
Chuang et al.

(10) Patent No.: US 9,352,263 B2
(45) Date of Patent: May 31, 2016

(54) MECHANISMS FOR AIR TREATMENT SYSTEM AND AIR TREATMENT METHOD

(71) Applicant: Taiwan Semiconductor Manufacturing Co., Ltd., Hsin-Chu, Taiwan (TW)

(72) Inventors: Tzu-Sou Chuang, Hsinchu (TW); Chieh-Jan Huang, Hsinchu (TW); Chi-Wen Kuo, Taipei (TW)

(73) Assignee: TAIWAN SEMICONDUCTOR MANUFACTURING CO., LTD., Hsin-Chu (TW)

( * ) Notice: Subject to any disclaimer, the term of this patent is extended or adjusted under 35 U.S.C. 154(b) by 333 days.

(21) Appl. No.: 14/141,693

(22) Filed: Dec. 27, 2013

(65) Prior Publication Data
US 2015/0182902 A1    Jul. 2, 2015

(51) Int. Cl.
*B01D 47/05* (2006.01)
*B01D 47/02* (2006.01)
*F24F 3/16* (2006.01)

(52) U.S. Cl.
CPC .............. *B01D 47/021* (2013.01); *B01D 47/05* (2013.01); *F24F 3/161* (2013.01); *B01D 2252/103* (2013.01)

(58) Field of Classification Search
CPC ................ B01D 47/021; B01D 47/05; B01D 2252/103; F24F 3/161
USPC .......... 95/226–228, 230, 237; 96/351; 62/640
See application file for complete search history.

(56) References Cited

U.S. PATENT DOCUMENTS

| | | | | |
|---|---|---|---|---|
| 4,345,916 A | * | 8/1982 | Richards | B01D 47/06 261/115 |
| 5,391,220 A | * | 2/1995 | Patterson | B01D 45/08 55/462 |
| 8,394,156 B2 | | 3/2013 | Chuang et al. | |
| 2011/0247661 A1 | | 10/2011 | Hayashida et al. | |

FOREIGN PATENT DOCUMENTS

| | | |
|---|---|---|
| CN | 102246281 | 11/2011 |
| TW | 200825632 | 6/2008 |
| WO | WO 2008/024263 | 2/2008 |

OTHER PUBLICATIONS

Chinese language office action dated Feb. 2, 2016, issued in application No. TW 103144918.

* cited by examiner

*Primary Examiner* — Frank Lawrence
(74) *Attorney, Agent, or Firm* — McClure, Qualey & Rodack, LLP

(57) ABSTRACT

Embodiments of mechanisms of an air treatment system are provided. The air treatment system includes a heating tank having a heating chamber containing air. The air includes gas, water vapor, a number of contaminants floating thereon. The air treatment system further includes a cooling tank having a first cooling chamber receiving the air from the heating chamber. Some of the water vapor in the first cooling tank condenses to a number of droplets, and some of the contaminants are mixed with into the droplets.

20 Claims, 4 Drawing Sheets

MECHANISMS FOR AIR TREATMENT SYSTEM AND AIR TREATMENT METHOD

BACKGROUND

Semiconductor devices are used in a variety of electronic applications, such as personal computers, cell phones, digital cameras, and other electronic equipment. Semiconductor devices are typically fabricated by sequentially depositing insulating or dielectric layers, conductive layers, and semi-conductive layers of material over a semiconductor substrate, and patterning the various material layers using lithography to form circuit components and elements thereon. Many integrated circuits are typically manufactured on a single semiconductor wafer, and individual dies on the wafer are singulated by sawing between the integrated circuits along a scribe line. The individual dies are typically packaged separately, in multi-chip modules, or in other types of packaging, for example.

Semiconductor wafer processing needs an environment virtually free from airborne molecular contamination (AMC) and particulate matter so the wafers may be processed without being contaminated. Accordingly, semiconductor processing is performed in clean rooms in which air is highly purified or filtered prior to its introduction into the clean room. Chemical filters are commonly employed to filter and purify the air prior to its introduction into the clean room.

As wafer processing is developed to nano level, more and more chemical filters are required to meet the tight AMC specification requirements for wafer processing. Further, as purified air must be provided to entire clean rooms, the energy needed for purifying the air is huge. Therefore, there are challenges to minimizing the AMC and the energy of making purified air.

BRIEF DESCRIPTION OF THE DRAWINGS

For a more complete understanding of the present disclosure, and the advantages of the present disclosure, reference is now made to the following descriptions taken in conjunction with the accompanying drawings, in which.

DETAILED DESCRIPTION

The making and using of various embodiments of the disclosure are discussed in detail below. It should be appreciated, however, that the various embodiments can be embodied in a wide variety of specific contexts. The specific embodiments discussed are merely illustrative, and do not limit the scope of the disclosure.

It is to be understood that the following disclosure provides many different embodiments, or examples, for implementing different features of the disclosure. Specific examples of components and arrangements are described below to simplify the present disclosure. These are, of course, merely examples and are not intended to be limiting. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description may include embodiments in which the first and second features are formed in direct or indirect contact.

Some variations of the embodiments are described. It is understood that additional operations can be provided before, during, and after the method, and some of the operations described can be replaced or eliminated for other embodiments of the method.

Figure 1:
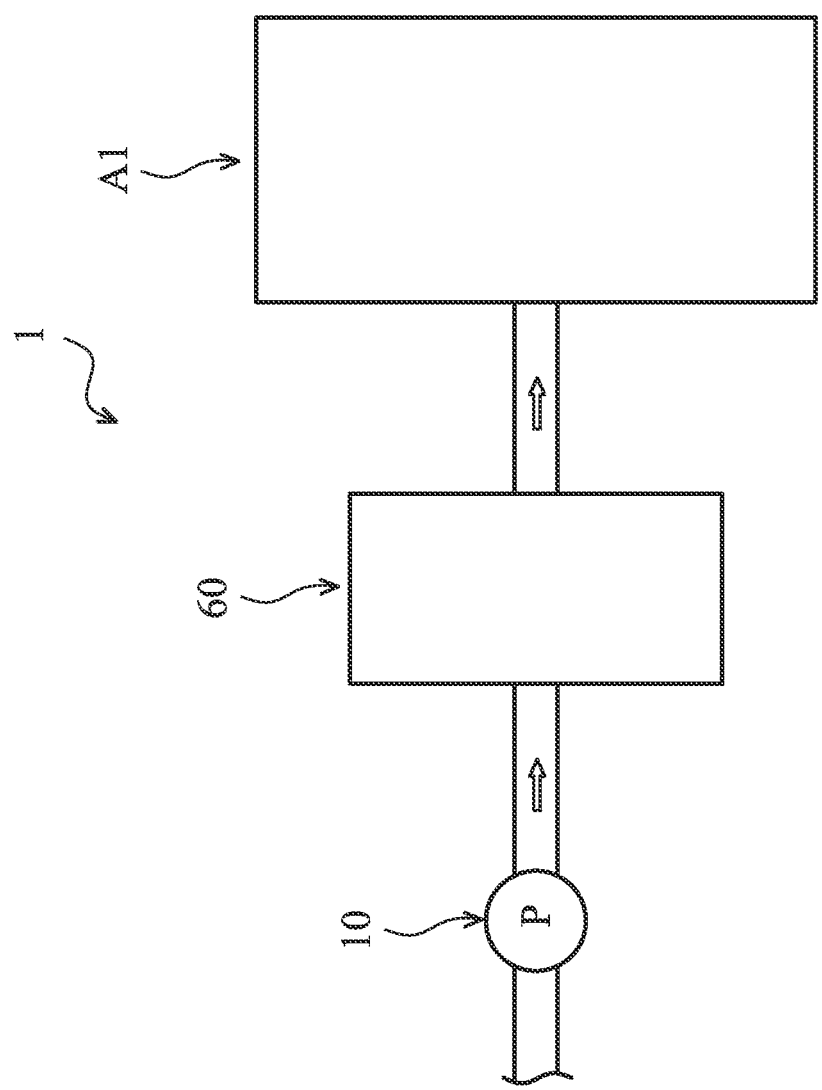
FIGS. 1 to 3 are schematic views of air treatment systems in accordance with some embodiments of the disclosure.

Embodiments of mechanisms for an air treatment system are provided. The air treatment system provides purified air into semiconductor apparatuses. FIG. 1 is a schematic view of an air treatment system 1 in accordance with some embodiments of the disclosure. The air treatment system 1 includes a pump 10 and a filter 60. The pump 10 draws air and directly transmits the air to semiconductor apparatus A1 via the filter 60. Therefore, the energy required for making purified air is decreased.

The filter 60 includes a chemical filter, such as high-efficiency particulate air (HEPA) and/or ultra low penetration air (ULPA) filter. The chemical filter is very expensive and needs to be replaced frequently. Further, the cutting size of the contaminants the filter 60 is only about 3 nm. The contaminants removal efficiency of the filter 60 is only about 99.9%. The cutting size and the contaminants removal efficiency of the filter 60 may not meet the requirements of some semiconductor apparatuses.

Figure 2:
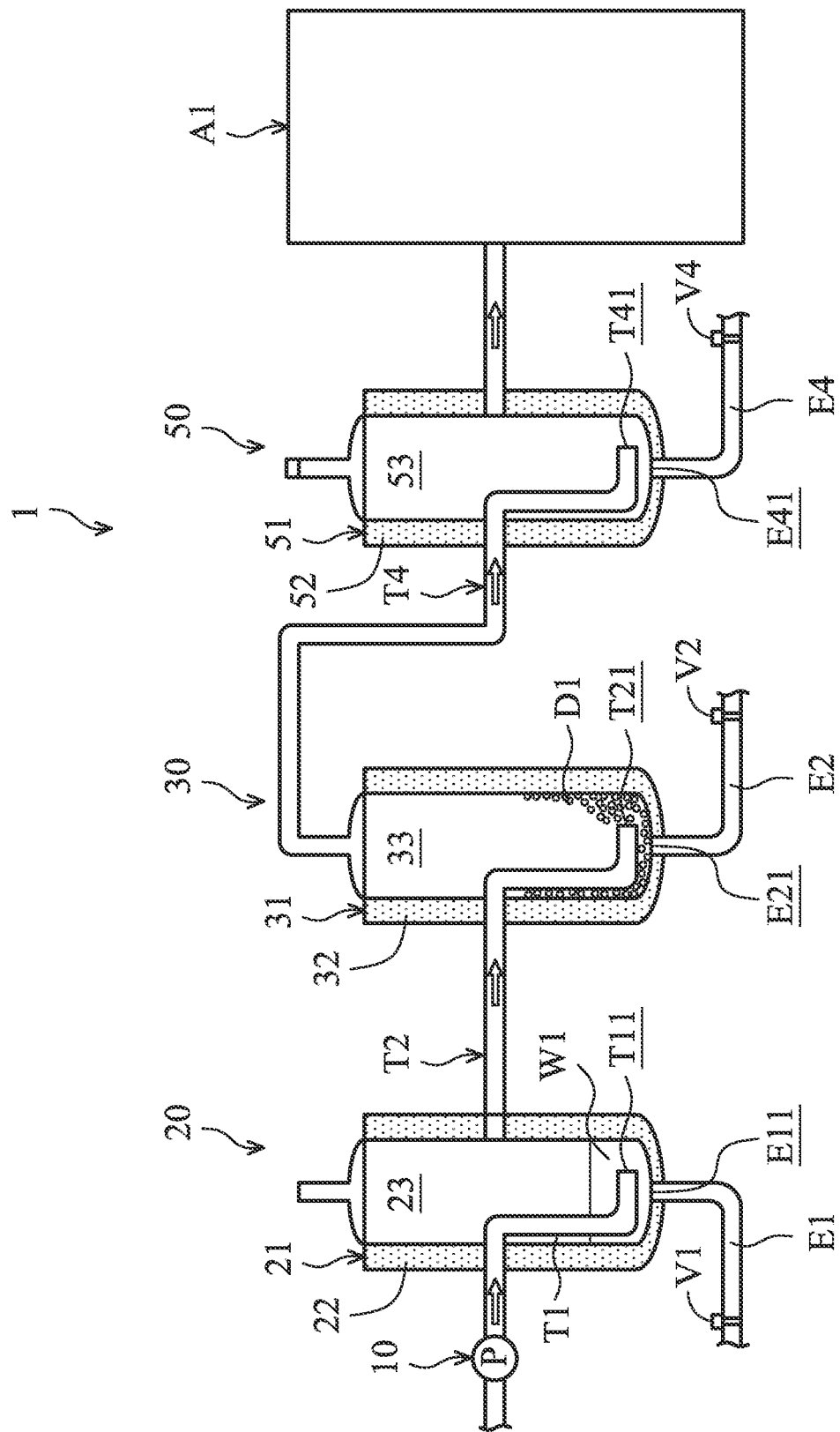

FIG. 2 is a schematic view of an air treatment system 1 in accordance with some embodiments of the disclosure. The air treatment system 1 includes a pump 10, a heating tank 20, a cooling tank 30, and a thermal tank 50.

The pump 10 draws air and transmits the air to the heating tank 20. In general, the air includes gas (such as oxygen and nitrogen), a number of contaminants (such as particles and AMC), and water vapor. The air drawn by the pump 10 has an ambient temperature, and an ambient pressure.

The ambient temperature is defined as temperature around the air treatment system 1 or as temperature of a clean room, in which the air treatment system 1 and the semiconductor apparatuses are located. In some embodiments, the ambient temperature is in a range from about 20° C. to about 30° C. For example, the ambient temperature is about 25° C. The ambient pressure is defined as pressure around the air treatment system 1 or the pressure of the clean room. In some embodiments, the ambient pressure is in a range from about 0.9 atm to about 1 atm. For example, the ambient pressure is about 1 atm.

The heating tank 20 receives the air from the pump 10. The heating tank 20 includes a heating housing 21, a heating mechanism 22 and a heating chamber 23. The heating mechanism 22 is disposed in the heating housing 21. The heating mechanism 22 is surrounding the heating chamber 23. The air received from the pump 10 is filled in the heating chamber 23.

In some embodiments, the heating chamber 23 contains water located at the bottom portion of the heating chamber 23. A first inlet tube T1 communicates with the pump 10 and the heating chamber 23. The first inlet tube T1 passes through the side wall of the heating chamber 23. The first inlet tube T1 has a first inlet opening T11 located at the bottom portion of the heating chamber 23. In other words, the first inlet opening T11 is located in the water W1. The air transmitted by the pump 10 flows in the heating chamber 23 via the first opening T11, and the air from the first opening T11 flows upward through the water. Therefore, some hydrophilic contaminants and some particles with greater size in the air are mixed with the water W1. In some embodiments, the contaminants are dissolved into the water W1. In some embodiments, the contaminants are undissolved in the water W1 to form suspension.

A first outlet E1 is disposed on the bottom of the heating housing 21, and communicates with the heating chamber 23. Furthermore, the first outlet E1 has a first outlet opening E11 located at the bottom of the heating chamber 23. A first valve V1 is disposed on the first outlet E1. When the first valve V1 is opened, the water W1 in the heating chamber 23 is exhausted from the heating chamber 23 via the first outlet E1.

In some embodiments, the pressure in the heating chamber 23 is increased by the pump 10. The pressure of the heating chamber 23 is in a range from about 0 Mpa to about 1.1 Mpa. For example, the pressure of the heating chamber 23 is about 0.34 Mpa. The heating mechanism 22 heats the heating chamber 23 to increase the temperature of the air in the heating chamber 23. The heating chamber 23 has a hot temperature in a range from about 60° C. to 80° C. For example, the hot temperature is about 70° C.

By the pressure and the hot temperature of the heating chamber 23, some of the water in the heating chamber 23 evaporates to water vapor, and thus the air in the heating chamber 23 contains more water vapor. In some embodiments, the water vapor in the heating chamber 23 is saturated.

The first cooling tank 30 communicates with the heating tank 20, and the first cooling tank 30 receives the air exhausted from the heating tank 20. The first cooling tank 30 receives the heating chamber 23. The first cooling tank 30 includes a first cooling housing 31, a first cooling mechanism 32, and a first cooling chamber 33. The first cooling mechanism 32 is disposed in the first cooling housing 31. The first cooling mechanism 32 is surrounding the first cooling chamber 33. The air received from the heating chamber 23 is filled in the first cooling chamber 33.

A second inlet tube T2 communicates with the heating chamber 23 and the first cooling chamber 33. The second inlet tube T2 has a second inlet opening T21 located at the bottom portion of the first cooling chamber 33.

A second outlet E2 is disposed on the bottom of the first cooling housing 31, and communicated with the first cooling chamber 33. Further, the second outlet E2 has a second outlet opening E21 located at the bottom of the first cooling chamber 33. A second valve V2 is disposed on the second outlet E2.

In some embodiments, the pressure in the first cooling chamber 33 is substantially the same as the pressure in the heating chamber 23, since the second inlet tube T2 communicates with the heating chamber 23 and the first cooling chamber 33. The first cooling mechanism 32 cools the first cooling chamber 33 to decrease the temperature of the air in the first cooling chamber 33. The first cooling chamber 33 has a cold temperature in a range from about 7° C. to 17° C. For example, the cold temperature is about 12° C.

In general, some of the contaminants are condensation nuclei, and the water vapor condenses onto the condensation nuclei resulting in the formation of droplets. By the cold temperature of the first cooling chamber 33, some of the water vapor in the first cooling tank 30 condenses to some of the contaminants to form a number of droplets D1. Since the pressure, for example 0.34 Mpa, of the first cooling chamber 33 is great, the collision rate of the droplets D1 and the contaminants is increased, and more contaminants are mixed with the droplets D1.

Further, the droplets D1 with the contaminants fall on the wall and the bottom of the first cooling chamber 33, and afterwards accumulate on the bottom of the first cooling chamber 33. After a predetermined time, the second valve V2 is opened, and the droplets D1 with the contaminants are exhausted via the second outlet E2.

The thermal tank 50 receives the air from the first cooling chamber 33. The thermal tank 50 includes a thermal housing 51, a thermal mechanism 52 and a thermal chamber 53. The thermal mechanism 52 is disposed in the thermal housing 51. The thermal chamber 53 is formed in the thermal mechanism 52. The air received from the first cooling tank 30 is filled in the thermal chamber 53.

The thermal mechanism 52 heats the thermal chamber 53 to increase the temperature of the air in the thermal chamber 53. The thermal chamber 53 has a thermal temperature in a range from about 20° C. to about 30° C. For example, the thermal temperature is the ambient temperature, about 25° C. Therefore, the air exhausted from the air treatment system 1 corresponds to the ambient temperature relative to the clean room or the semiconductor apparatus A1.

In some embodiments, a fourth inlet tube T4 communicates with the thermal tank 50 and the first cooling tank 30. The fourth inlet tube T4 has a fourth inlet opening T41 located at the bottom portion of the thermal chamber 53. An end of the fourth inlet tube T4 is disposed on the top of the first cooling chamber 33. Therefore, some contaminants with greater weight may not flow to the thermal chamber 53 via the fourth inlet tube T4.

A fourth outlet E4 is disposed on the bottom of the thermal housing 51, and communicated with the thermal chamber 53. Further, the fourth outlet E4 has a fourth outlet opening E41 located at the bottom of the thermal chamber 53. A fourth valve V4 is disposed on the fourth outlet E4.

Figure 3:
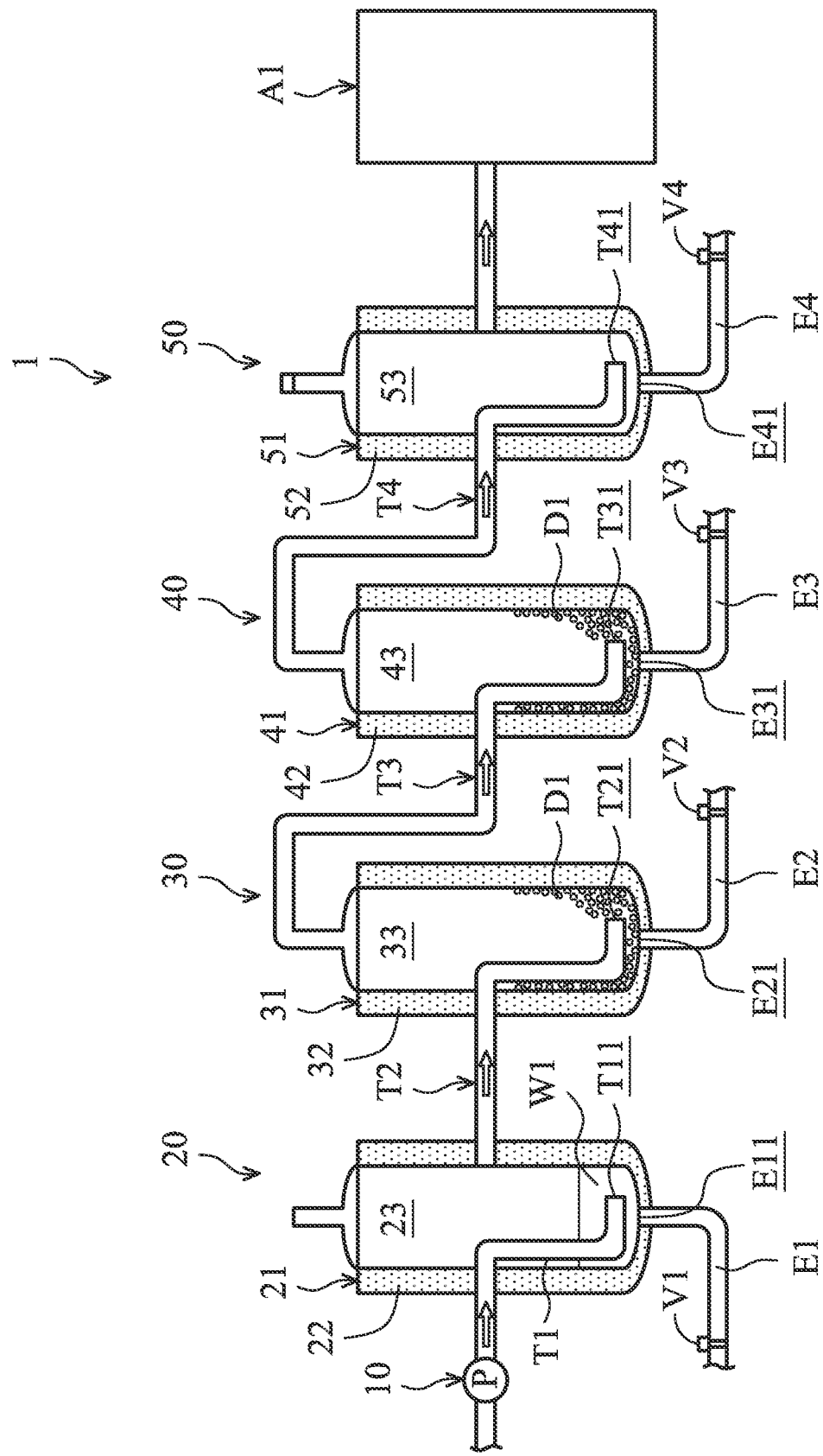

In some embodiments, more than one cooling tanks are installed in the air treatment system 1 to further decrease the contaminants and the water vapor of the air. FIG. 3 is a schematic view of an air treatment system 1 in accordance with some embodiments of the disclosure. The air treatment system 1 further includes a second cooling tank 40. The second cooling tank 40 communicates with the first cooling tank 30, and receives the air exhausted from the first cooling chamber 33.

The second cooling tank 40 includes a second cooling housing 41, a second cooling mechanism 42, and a second cooling chamber 43. The second cooling mechanism 42 is disposed in the second cooling housing 41. The second cooling mechanism 42 is surrounding the second cooling chamber 43. The air received from the first cooling chamber 33 is filled in the second cooling chamber 43.

A third inlet tube T3 communicates with the first cooling chamber 33 and the second cooling chamber 43. An end of the third inlet tube T3 is disposed on the top of the first cooling chamber 33. Therefore, some droplets D1 with greater weight may not flow to the second cooling chamber 33 via the third inlet tube T3. The third inlet tube T3 has a third inlet opening T31 located at the bottom portion of the second cooling chamber 43. A third outlet E3 is disposed on the bottom of the second cooling housing 41, and communicated with the second cooling chamber 43. Furthermore, the third outlet E3 has a third outlet opening E31 located at the bottom of the second cooling chamber 43. A third valve V3 is disposed on the third outlet E3.

In some embodiments, the pressure in the second cooling chamber 43 is substantially the same as the pressure in the heating chamber 23 and the first cooling chamber 33 since the third inlet tube T3 communicates with the first cooling chamber 33 and the second cooling chamber 43. The second cooling mechanism 42 cools the second cooling chamber 43 to decrease the temperature of the air. The second cooling chamber 43 has a cold temperature in a range from about 7° C. to 17° C. For example, the cold temperature is in a range from about 12° C. or about 10° C.

By the cold temperature of the second cooling chamber 43, some of the water vapor in the second cooling tank 40 condenses to some of the contaminants to form a number of droplets D1. Since the pressure, for example 0.34 Mpa, of the second cooling chamber 43 is greater, the collision rate of the droplets D1 and the contaminants is increased, and more contaminants are mixed with the droplets D1.

Further, the droplets D1 with the contaminants fall on the wall and the bottom of the second cooling chamber 43, and afterwards accumulate on the bottom of the second cooling chamber 43. After a predetermined time, the third valve V3 is opened, and the droplets D1 with the contaminants are exhausted via the third outlet E3.

In addition, the thermal tank 50 receives the air from the second cooling chamber 43. The air received from the second cooling tank 40 is filled in the thermal chamber 53. The fourth inlet tube T4 communicates with the thermal tank 50 and the second cooling tank 40. An end of the fourth inlet tube T4 is disposed on the top of the second cooling chamber 43.

Figure 4:
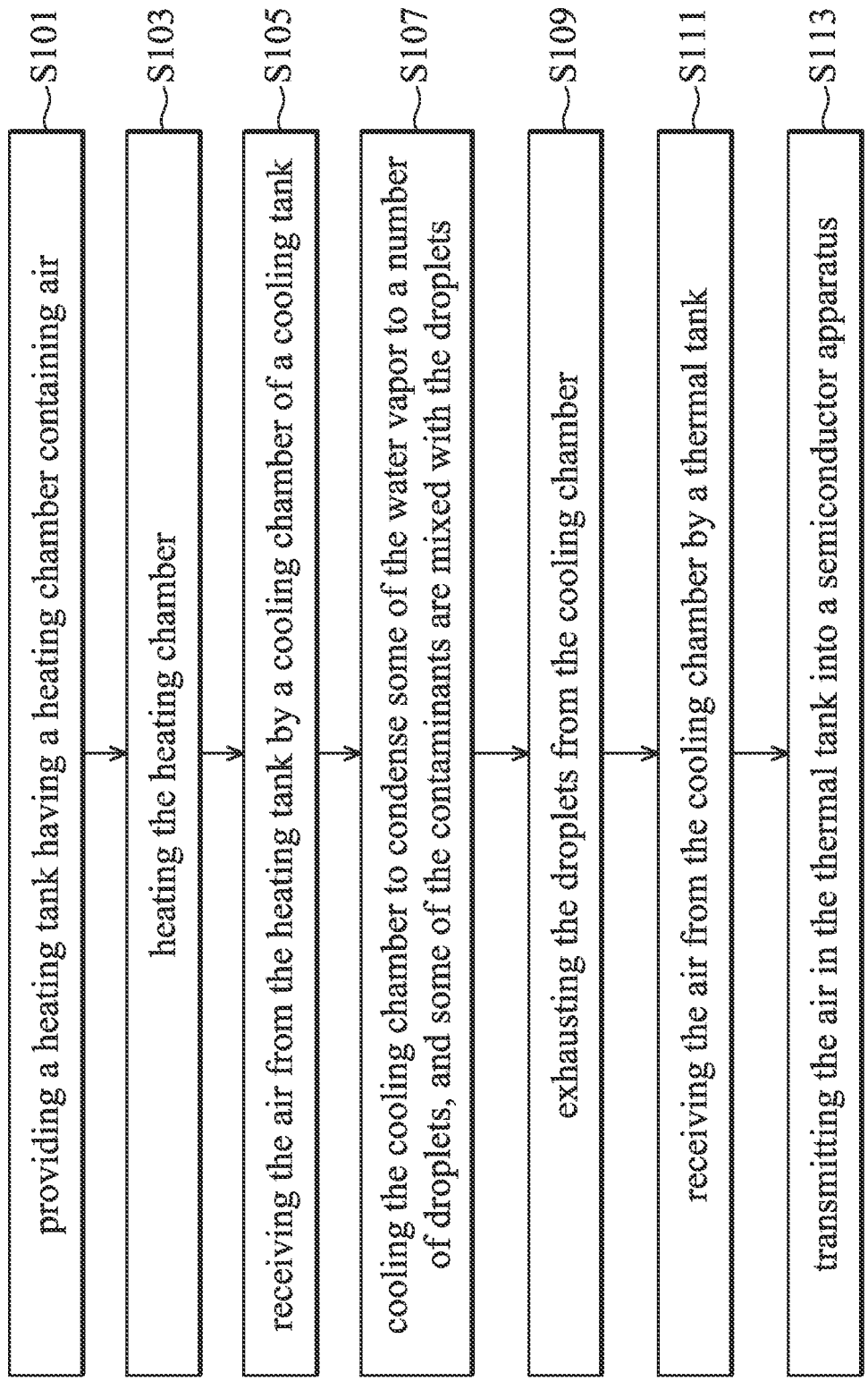
FIG. 4 is a flow chart of an air treatment method in accordance with some embodiments of the disclosure.

FIG. 4 is a flow chart of an air treatment method in accordance with some embodiments of the disclosure. In step S101, the heating tank 20 having the heating chamber 23 is provided. The pump 10 draws air and transmits the air to the heating tank 20 via the first inlet tube T1.

In step S103, the heating mechanism 22 is enabled, and the air in the heating chamber 23 is heated at the hot temperature. The water W1 in the heating chamber 23 is heated and is evaporated to make the water vapor of the air to be saturated. Therefore, the air in the heating chamber 23 contains more water vapor.

In step S105, the first cooling chamber 33 receives the air from the heating tank 20. In step S107, the first cooling mechanism 32 is enabled to cool the first cooling chamber 33. Some of the water vapor is condensed to some of the contaminants, such as particles and hydrophilic AMC, to form a number of droplets D1. In some embodiments, the first cooling chamber 33 has a pressure in a range from about 0 Mpa to about 1.1 Mpa. Therefore, the collisions between droplets D1 and contaminants are raised.

In step S109, the droplets D1 with the contaminants are exhausted from the first cooling chamber 33 after a predetermined time, such as 1 hour.

Further, the second cooling chamber 43 receives the air from the first cooling tank 30. The temperature of the second cooling chamber 43 is lower than or equal to the temperature of the first cooling chamber 33. The second cooling chamber 43 further decreases the contaminants and the water vapor of the air. In some embodiments, the second cooling chamber 43 is omitted.

In some embodiments, the cutting size of the contaminants (such as particles) of the air treatment system 1 is about 0.1 nm greater than the cutting size of the contaminants of chemical filters, for example. The contaminants removal efficiency of the air treatment system 1 is also about 99.99% greater than carbon dynamic air box filters.

In step S111, the thermal tank 50 receives the purified air from the second cooling chamber 43. In other words, the thermal tank 50 receives the air from the first cooling chamber 33 via the second cooling chamber 43. In some embodiments, if the second cooling chamber 43 is omitted, the thermal tank 50 receives the air from the first cooling chamber 33. The air is heated to the ambient temperature.

In step S113, the air in the thermal tank 50 is transmitted into a semiconductor apparatus A1. Therefore, the consumption of purified air is greatly decreased compared to applying purified air to the entire clean room.

Embodiments of mechanisms for an air treatment system are provided. The air treatment system removes the contaminants in the air by heating and cooling the air. The contaminants are mixed with the droplets condensed from water vapor of the air. Furthermore, high-pressure air is utilized to raise the collisions between droplets and contaminants (nano particles and AMC). Therefore, most of the contaminants and the water vapor in the air are removed. The efficiency of contaminant removal of the air treatment system is increased. In addition, the air treatment system provides the purified air to a semiconductor apparatus, and therefore, the energy required for making purified air is decreased.

In some embodiments, an air treatment system is provided. The air treatment system includes a heating tank having a heating chamber containing air. The air includes gas, water vapor, and a number of contaminants floating thereon. The air treatment system further includes a cooling tank having a first cooling chamber receiving the air from the heating chamber. Some of the water vapor in the first cooling tank condenses to some of the contaminants to form a number of droplets.

In some embodiments, an air treatment system is provided. The air treatment system includes a pump and a heating tank having a heating chamber containing air. The air includes gas, water vapor, and a number of contaminants floating thereon. The air treatment system also includes a cooling tank having a cooling chamber receiving the air from the heating chamber. The air treatment system further includes a thermal tank having a thermal chamber receiving the air from the cooling chamber. The air in the thermal tank is transmitted into a semiconductor apparatus. Some of the water vapor in the cooling tank condenses to some of the contaminants to form a number of droplets.

In some embodiments, an air treatment method is provided. The air treatment method includes providing a heating tank having a heating chamber containing air. The air includes gas, water vapor, and a number of contaminants floating thereon. The air treatment method also includes heating the heating chamber and receiving the air from the heating tank by a cooling chamber of the cooling tank. The air treatment method further includes cooling the cooling chamber to condense some of the water vapor to some of the contaminants to form a number of droplets. The air treatment method further includes exhausting the droplets from the cooling chamber.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An air treatment system, comprising:
   a heating tank comprising a heating chamber containing air, wherein the air comprises gas, water vapor, and a plurality of contaminants floating thereon; and
   a cooling tank having a first cooling chamber receiving the air from the heating chamber;
   wherein some of the water vapor in the first cooling chamber condenses to some of the contaminants to form a plurality of droplets.

2. The air treatment system as claimed in claim 1, wherein the cooling tank comprising an outlet communicating with the cooling chamber, and the droplets are exhausted from the cooling chamber via the outlet.

3. The air treatment system as claimed in claim 1, wherein the water vapor in the heating tank is saturated.

4. The air treatment system as claimed in claim 1, wherein the heating chamber further contains water, and the water is evaporated to make the water vapor to be saturated by the heat of the heating chamber.

5. The air treatment system as claimed in claim 1, wherein the heating chamber has a hot temperature, the cooling chamber has a cold temperature, and the hot temperature is greater than the cold temperature.

6. The air treatment system as claimed in claim 1, wherein the heating chamber has a pressure in a range from about 0 Mpa to about 1.1 Mpa, and the first cooling chamber has a pressure in a range from about 0 Mpa to about 1.1 Mpa.

7. An air treatment system, comprising:
   a pump;
   a heating tank having a heating chamber containing air, wherein the air comprises gas, water vapor, a plurality of contaminants floating thereon;
   a cooling tank having a cooling chamber receiving the air from the heating chamber; and
   a thermal tank having a thermal chamber receiving the air from the cooling chamber, wherein the air in the thermal tank is transmitted into a semiconductor apparatus;
   wherein some of the water vapor in the cooling tank condenses to some of the contaminants to form a plurality of droplets.

8. The air treatment system as claimed in claim 7, wherein the cooling tank comprises an outlet that communicates with the cooling chamber, and the droplets are exhausted from the cooling chamber via the outlet.

9. The air treatment system as claimed in claim 7, wherein the water vapor in the heating tank is saturated.

10. The air treatment system as claimed in claim 7, wherein the heating chamber further contains water, and the water is evaporated to make the water vapor to be saturated by the heat of the heating chamber.

11. The air treatment system as claimed in claim 7, wherein the heating chamber has a hot temperature, the cooling chamber has a cold temperature, and the hot temperature is greater than the cold temperature.

12. The air treatment system as claimed in claim 7, wherein the heating chamber has a pressure in a range from about 0 Mpa to about 1.1 Mpa, and the cooling chamber has a pressure in a range from about 0 Mpa to about 1.1 Mpa.

13. The air treatment system as claimed in claim 7, wherein the thermal chamber has a thermal temperature in a range from about 20° C. to about 30° C.

14. An air treatment method, comprising:
   providing a heating tank having a heating chamber containing air, wherein the air comprises gas, water vapor, a plurality of contaminants floating thereon;
   heating the heating chamber;
   receiving the air from the heating tank by a cooling chamber of;
   cooling the cooling chamber to condense some of the water vapor to some of the contaminants to form a plurality of droplets, wherein some of the contaminants are mixed with into the droplets; and
   exhausting the droplets from the cooling chamber.

15. The air treatment method as claimed in claim 14, wherein the water vapor in the heating chamber is saturated.

16. The air treatment method as claimed in claim 14, wherein the heating chamber further containing water, and the water is evaporated to make the water vapor to be saturated by the heat of the heating chamber.

17. The air treatment method as claimed in claim 14, wherein the heating chamber has a hot temperature, the cooling chamber has a cold temperature, and the hot temperature is greater than the first cold temperature.

18. The air treatment method as claimed in claim 14, wherein the heating chamber has a pressure in a range from about 0 Mpa to about 1.1 Mpa, and the cooling tank has a pressure in a range from about 0 Mpa to about 1.1 Mpa.

19. The air treatment method as claimed in claim 14, comprising receiving the air from the cooling chamber by a thermal tank, and heating the air in the thermal chamber.

20. The air treatment method as claimed in claim 19, comprising transmitting the air in the thermal tank into a semiconductor apparatus.

* * * * *